Feb. 7, 1950     D. B. CRAWFORD     2,496,380
GAS PURIFYING METHOD AND APPARATUS
Filed April 18, 1946
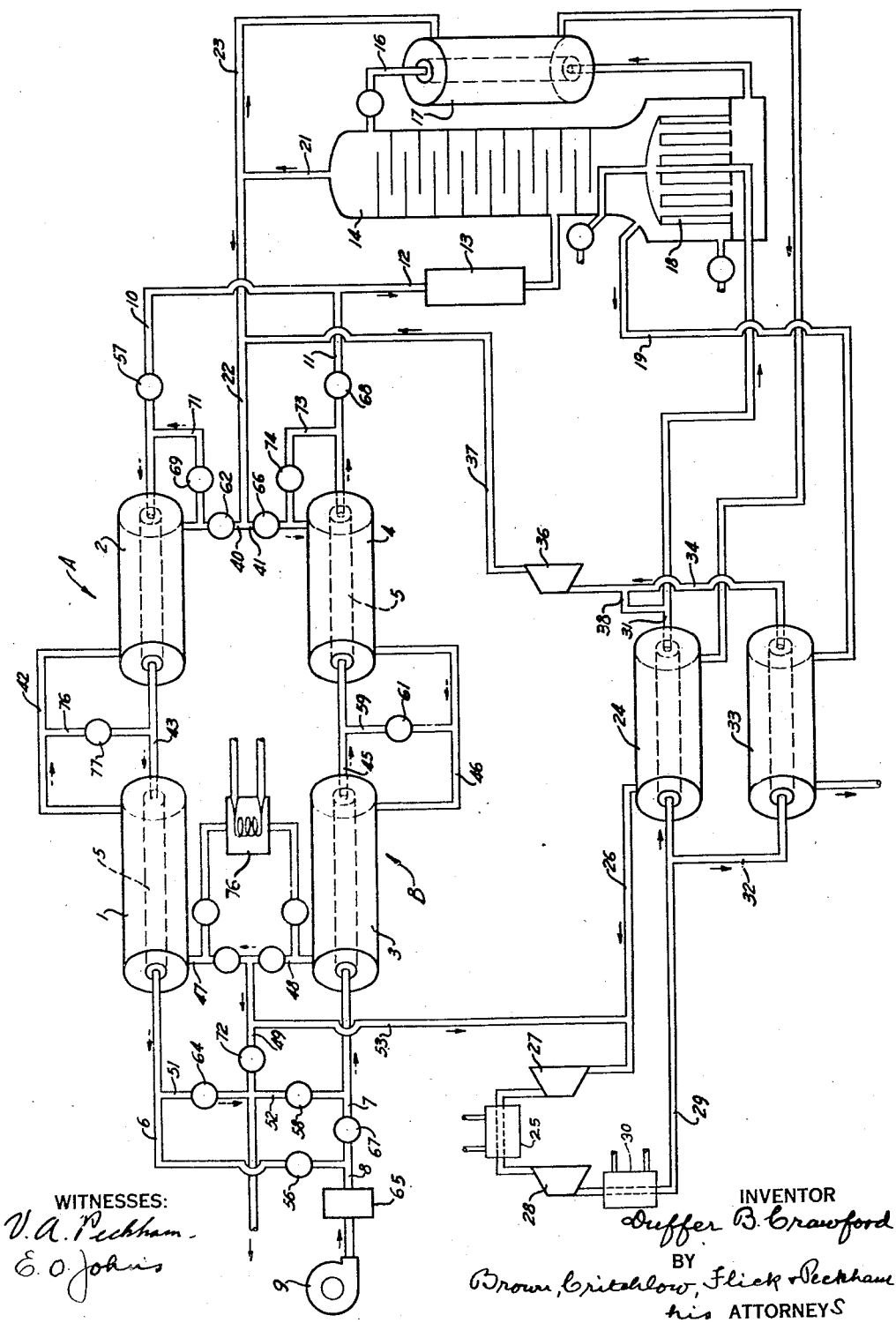
WITNESSES:
INVENTOR
Duffer B. Crawford
BY
his ATTORNEYS Patented Feb. 7, 1950

2,496,380

UNITED STATES PATENT OFFICE 2,496,380

GAS PURIFYING METHOD AND APPARATUS

Duffer B. Crawford, Jeannette, Pa., assignor to Elliott Company, Jeannette, Pa., a corporation of Pennsylvania Application April 18, 1946, Serial No. 662,937

6 Claims. (Cl. 62—175.5)

This invention relates to gas purifying apparatus, and more particularly to such apparatus in which the purifying is accomplished by cooling the gas to very low temperatures.

There are many cases where it is necessary or highly desirable to remove impurities from a gaseous mixture that is to be reduced to a very low temperature, such as for refrigeration, liquefaction and fractionation. Some examples are liquid air plants, oxygen and other gas producing systems and coke oven gas separation. In fact, the lack of an efficient and economical system for purifying the incoming gaseous mixture in such processes has seriously interfered with their successful performance. A specific example of the importance of gas purification is found in plants where oxygen is produced by refrigerating air to a temperature at which the oxygen and nitrogen may be separated from each other by conventional means. On its way to the fractionating column the air is passed through a heat exchanger or reversing regenerators where it is cooled to a very low temperature by the cold gases separated out of the air in the column. As the air flows through the regenerator or heat exchanger the water vapor, carbon dioxide and other impurities in it freeze out and deposit themselves on the heat exchanging surfaces. This deposition, if continued, will plug the apparatus within a short period and make it inoperable. For this reason, periodic deriming of the regenerator is a vital function of an oxygen producing plant. Most plants of this character of which I am aware must be shut down from time to time for deriming. Unless the complicated procedure of deriming is planned carefully, it will increase the cost of refrigeration to the point where the entire separation operation will become uneconomical. Plants using reversing regenerators for cooling and cleaning the air have operated successively on high pressure and low pressure gas streams. At best, these seldom remove all of the carbon dioxide or any of the acetylene from the air and suffer the disadvantage of periodic switching of the valves which causes pressure shocks in the system that upset the operation of its different elements. The use of oxygen for cleaning the regenerators results in some mixing of air with the oxygen, which reduces the purity of the oxygen.

It is among the objects of this invention to provide a method and apparatus for removing low volatile substances from a gaseous mixture at very low temperatures in which deriming of the purifier can be carried on without interrupting the continuous operation of the system, in which pressure shocks to the system due to switching from cooling to deriming and back again have no appreciable effect, in which a gas other than the desired final product may be used for deriming the purifier in a gas separation process, and in which the deriming procedure is economical even in a low pressure system.

The invention is illustrated in the accompanying drawing by a diagrammatic view of my gas purifying apparatus which is shown, for the purpose of illustration only, as a part of an oxygen producing plant. It is to be understood that this invention is not limited to gas separation systems.

Referring to the drawing, two heat exchangers or units A and B, disposed in parallel relation, may be divided into two sections, 1 and 2, 3 and 4, respectively, for a purpose to be described later. The exchanger units may be formed in any conventional manner with one or more passages for a gas that is to be cooled separated by metallic walls from one or more passages for the gas that does the cooling. To simplify this description, however, each exchanger section is shown provided with only two concentric passages formed by mounting a tube 5 axially within a closed cylindrical casing. The tube forms an inner passage for the gas being cooled, while the annular space between the tube and casing forms a separate outer passage for the cooling gas.

The inlet ends of tubes 5 are connected by branch pipes 6 and 7 with a pipe 8 which is connected to a blower 9 by which a gaseous mixture at low pressure can be blown through the heat exchangers. For the purpose of this description, it will be assumed that the blower is supplying air which will be cooled in order to fractionate it so as to provide substantially pure oxygen. The outlet ends of the inner passages of the heat exchanger sections 2 and 4 are connected by branch pipes 10 and 11 to a pipe 12 that leads to an accumulator 13 connected to the side of a fractionating column 14. The accumulator is filled with silica gel, activated charcoal, alumina or other suitable material having a high heat capacity so that it acts as a reservoir of refrigeration, and also having absorbent capacity for air at very low temperatures so that it acts as a reservoir of air. These characteristics of the accumulator decrease the temperature and pressure fluctuations in the air stream caused by switching the air from one exchanger unit A or B to the other, as will be described presently, when one unit has become plugged by impurities condensed therein.

Oxygen is separated from the air in this column by liquid nitrogen reflux introduced into the column above the air inlet from a pipe 16 connected through a reflux cooler 17 to the bottom of a reboiler 18. Oxygen gas leaves the lower part of the column through a pipe 19, while the separated nitrogen leaves through a pipe 21 at the top of the column. Some of this nitrogen is led toward the heat exchanger units A and B by a pipe 22, and the rest of it flows through a pipe 23 and reflux cooler 17 to a heat exchanger 24 connected by a pipe 26 to the inlet of compressors 27 and 28 with which the usual intercooler 25 and after cooler 30 are associated. These compressors and coolers are connected by an outlet pipe 29 to the inner passage of exchanger 24 from which cold nitrogen flows through a pipe 31 to the reboiler 18. Pipe 29 also is connected through a pipe 32 to a heat exchanger 33 connected by an outlet pipe 34 to one or more turbo-expanders 36 joined by a pipe 37 to nitrogen pipe 22. Heat exchanger outlet pipes 31 and 34 are connected by a short pipe 38 so that the expander can take nitrogen from both lines. The valves, automatic controls and other incidental equipment used in the system beyond heat exchanger units A and B are not shown, because they do not directly affect the operation and deriming of those exchangers.

Nitrogen pipe 22 is connected by branch pipes 40 and 41 to the cold ends of the outer passages through heat exchanger sections 2 and 4, respectively. The adjacent ends of the outer passages in exchanger sections 1 and 2 are connected by a pipe 42, while the corresponding ends of the inner passages or tubes 5 are joined by a pipe 43. Heat exchanger sections 3 and 4 are connected in the same manner by pipes 46 and 45. The warm ends of the outer passages in exchanger sections 1 and 3 are connected by pipes 47 and 48 to each other and to a pipe 49 that leads to the atmosphere or to a suitable receiver, depending upon what is to be done with the nitrogen gas issuing from the pipe. Pipes 6 and 7 also are connected to outlet pipe 49 by means of pipes 51 and 52, respectively. Between this connection and pipes 47 and 48, the outlet pipe 49 is connected by a pipe 53 to pipe 26 that leads to the compressors, so that part of the nitrogen is fed back into the system to maintain the necessary heat balance. The nitrogen from pipes 26 and 53 is compressed in compressors 27 and 28 and is cooled in heat exchangers 24 and 33 by cold gaseous nitrogen and oxygen flowing away from the rectification column. At least some of the cold compressed nitrogen leaving exchanger 24 is condensed into a liquid in reboiler 18 by means of the liquid oxygen surrounding the reboiler. Cold compressed nitrogen from exchanger 33, and whatever nitrogen is flowing through pipe 38 from pipe 31, is delivered to expander 36 wherein it is expanded to low pressure and very low temperature. The cold, expanded nitrogen then flows through pipe 37 and is commingled with the nitrogen in pipe 22 to augment the cooling capacity of the last-mentioned nitrogen.

If it is assumed that during a given period of operation of the plant the heat exchanger unit B is the one in which cooling and purifying of the incoming air is taking place, blower 9 pumps the air through pipes 8 and 7 into the unit from the cold end of which it is conducted through pipes 11 and 12 to the fractionating column where separation of oxygen and nitrogen takes place. The air can not enter heat exchanger unit A because a valve 56 in pipe 6 and a valve 57 in pipe 10 are closed. Pipe 52 is closed by a valve 58, while a by-pass pipe 59 connecting pipes 45 and 46 is closed by a valve 61. The air flowing through tubes 5 of exchanger unit B is cooled by cold nitrogen flowing from pipes 22 and 41 through the outer passage of the same heat exchanger unit and out through pipes 48 and 49. Nitrogen is prevented from passing through the other heat exchanger unit A at this time because pipe 40 is closed by a valve 62, and pipe 51 is closed by a valve 64. Continuous flow of gas in only one direction is indicated by the solid arrows, while the arrows with broken shafts indicate the direction of flow of the air and nitrogen while the air is being cooled in heat exchanger unit B and heat exchanger unit A is being derimed.

Satisfactory and economical performance of this oxygen producing system occurs when the air is delivered to the first heat exchanger section at a pressure only slightly above atmospheric, such as about 18 pounds per square inch absolute, and at a temperature of about 70°. All temperatures mentioned herein are Fahrenheit. Under these conditions the air should leave the second section of the exchanger at a temperature in the neighborhood of −310°, while the nitrogen should enter the exchanger unit at about −318° and leave it through pipe 49 at about 62°. Under these conditions of steady operation the tubes 5, which serve to separate the two gas streams in the heat exchanger, will be at some temperature between the temperatures of the air and nitrogen.

If the air is brought in untreated, the position along tube 5 at which a frost will begin to appear will depend upon the humidity. Often, such as on humid days, it is desirable to pass the air through some form of preliminary drying apparatus 65, e. g., a silica gel dryer, so that the frost will not appear until a zone of tube 5 is reached having a temperature of about −20°. Deposition of water as a frost or rime will continue to take place until the temperature reaches about −110°. Below this temperature the quantity of water deposited is extremely small and is seldom objectionable. As the air continues along the heat exchanger tube toward colder and colder zones, little riming takes place until a temperature of about −220° is reached. Here carbon dioxide is deposited as a snow, and this continues to about −265°. As the air cools to −310°, a large percentage of the acetylene and other hydrocarbons, if present, will be deposited, thereby eliminating the danger of explosions in the system. When the deposits have built up sufficiently to interfere with performance of the heat exchanger, it must be defrosted.

It is a feature of this invention that in deriming the heat exchangers the deposits therein are sublimed and are carried away as vapor in a stream of the nitrogen available as an otherwise wasted product of the separation process. Aside from the great loss in refrigeration, extremely little deriming would take place if the nitrogen were passed through the air passage at the same temperature at which the nitrogen entered the nitrogen passage during the air-cooling period, so it is necessary to raise the temperature of the nitrogen before using it for deriming purposes. A manner in which this may be done will be described presently. To pass the warmed nitrogen directly through the air passage only, would raise the temperature of the heat exchanger so much that the work of refrigeration required to recool the exchanger to normal operating temperatures after deriming becomes so great that the system is inefficient. Therefore, the warmed nitrogen is passed through the normal nitrogen passage of the heat exchanger unit from its warm end to its cold end, and then back through the plugged air passage from its cold end to its warm end. This flow path results in heat transfer between the nitrogen in the two passages, and minimizes the temperature rise of the heat exchanger mass. In the separation of oxygen from air at low pressures, the volume of nitrogen available for carrying away vapor from tubes 5 is less than the volume of air in which those vapors originally were carried. This fact, plus the fact that the nitrogen becomes only partially saturated with impurities during sublimation, present a problem that can be solved by increasing the sublimation rate of the deposit. This is accomplished by warming the heat exchanger unit a few degrees. This warming is unnecessary in high pressure systems where the volume of returning nitrogen greatly exceeds the volume of ingoing air, and it also is unnecessary for removing impurities that have been deposited near the point where the nitrogen starts back through the air passage.

When riming of heat exchanger unit B starts to interfere with its operation it is time to switch over to the other exchanger unit so that exchanger unit B can be derimed without interrupting the continuous operation of the plant. Accordingly, the cold nitrogen is shut off by closing a valve 66 in branch pipe 41 and is directed to exchanger unit A by opening valve 62 in branch pipe 40. For a very short time, such as a minute or two, the low pressure air may be permitted to continue to flow through exchanger unit B to warm it a few degrees, preferably not over about 35° in this case. Then valves 56 and 57 are opened, and a valve 67 in pipe 7, and a valve 68 in pipe 11 are closed. A valve 69 in a pipe 71, connecting pipe 46 with pipe 10, is closed during this period. The air therefore flows through heat exchanger unit A, where it is cooled by the returning nitrogen, and into the fractionating column.

A valve 72 in nitrogen discharge pipe 49, between pipe 53 and the junction of pipes 51 and 52 with pipe 49, is closed so that a portion of the nitrogen from heat exchanger unit A will be returned to the system through pipe 53, and the rest of the clean nitrogen, warmed to about 62° in that unit, will enter the warm end of heat exchanger unit B through pipe 48. This last nitrogen flows through the outer passage of exchanger unit B in reverse direction to normal flow and is cooled down by contact with the cold walls of the passage. As the cooled nitrogen leaves the cold end of this passage through pipe 41, it is conducted into the air passage tubes 5 by a pipe 73 containing an open valve 74 and connecting pipe 41 with pipe 11. The nitrogen flows back through the air passage in the direction opposite to normal flow, and leaves it through pipe 7, valve 58 in pipe 52, and out through pipe 49. It will be seen that this nitrogen, contaminated by the vapors that it picks up and sweeps out of the tubes 5, does not mix with the pure nitrogen flowing through pipe 53 to the compressors. The flow path created by returning the nitrogen on itself through the air passage of heat exchanger unit B, results in heat transfer between the nitrogen in the two passages which minimizes the temperature rise of the heat exchanger mass in comparison with the usual deriming procedure where the deriming gas is passed directly through the plugged passages only.

The heat which is introduced into heat exchanger B by the nitrogen during deriming is concentrated primarily at the cold end of exchanger section 4 where the nitrogen is turned back on itself. Therefore, the carbon dioxide deposits will be cleaned out in a few minutes, but the frost formed by water near the warm end of tre exchanger unit will not be removed to such a great extent. Heat can be applied nearer the warm end of the exchanger unit where the water is deposited, by short circuiting the nitrogen through the unit after removal of carbon dioxide has been completed. Although this short circuiting could be done by incorporating a by-pass in a single section heat exchanger, it may be more convenient to divide each exchanger unit A and B into two sections as previously mentioned. Bypass pipe 59 can then connect pipes 45 and 46 which join the two sections of heat exchanger unit B, and by opening by-pass valve 61 and closing valve 74 more or less, some or all of the defrosting nitrogen can be turned back at that point into the air passage through section 3. This short circuited nitrogen will warm the cold end of exchanger section 3 and therefore will quickly defrost that section. As soon as heat exchanger unit B has been derimed completely, valve 58 is closed and valve 49 is opened so that the waste nitrogen from heat exchanger unit A will pass out through valve 49 instead of circulating through the other exchanger unit B. Exchanger unit B now remains idle until it is time to derime exchanger unit A, whereupon the valves are actuated to switch the air and cold nitrogen back to exchanger unit B.

It will be noted that before the derimed heat exchanger unit is put back into operation, it is cooled to normal operating temperatures by the outgoing cold nitrogen which is passed through the outer passage of the unit at the same time that the other exchanger unit is being warmed by the incoming air to increase the sublimation rate.

A chest 76 containing a heating coil is shown between heat exchanger sections 1 and 3 where it is connected to pipes 47 and 48. This heating unit is switched into operation to heat the nitrogen for deriming purposes only in cases of emergency caused by maladroit operation of the preliminary dehumidification unit 65.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. Continuously operable gas purifying apparatus for use with a gas separation unit, comprising a pair of heat exchangers each having a passage therethrough for an incoming gaseous mixture flowing to the separation unit, each exchanger having another passage therethrough for countercurrent flow of an outgoing cold gas separated in said unit, means for stopping the flow of said gaseous mixture to either of the exchangers while it is flowing through the other one, means for directing said outgoing gas to the exchanger through which said mixture is flowing, whereby to cool the mixture, means for conducting the gas leaving said last-mentioned exchanger to the warm end of the gas passage in the other exchanger for reverse flow therethrough, and means for conducting the gas leaving the cold end of said last-mentioned gas passage to the adjacent cold end of the mixture passage in the same exchanger for reverse flow through said mixture passage to remove any matter deposited therein by the cooled gaseous mixture previously flowing through it.

2. The method of deriming a countercurrent heat exchanger having warm and cold ends and in which a rime-depositing gaseous mixture in one passage is cooled by indirect contact with a cold gas in another passage, comprising stopping flow of said cold gas to the cold end of the cold gas passage, stopping flow of said mixture to the exchanger, then warming said cold gas before it reaches the exchanger, and directing the warmed gas in reverse direction through the cold gas passage in the exchanger and then in reverse direction through the passage requiring deriming to remove the rime therefrom.

3. The method of deriming a countercurrent heat exchanger in which a rime-depositing gaseous mixture in one passage is cooled by indirect contact with a cold gas in another passage, comprising stopping flow of said cold gas to the exchanger, continuing flow of said mixture through the exchanger for a short time to warm the exchanger, then stopping the flow of said mixture to the exchanger, and directing warm gas in reverse direction through the cold gas passage in the exchanger and then in reverse direction through the passage requiring deriming.

4. The method of deriming only the warmer end of countercurrent heat exchanging means in which a rime-depositing gaseous mixture in one passage is cooled by indirect contact with a cold gas in another passage, comprising stopping flow of said mixture and countercurrent flow of cold gas to said passages, and directing gas in reverse direction part way through said cold gas passage and then into the other passage at a point between its ends and then in reverse direction through said other passage to remove the rime from it.

5. The method of continuously purifying a gaseous mixture, comprising passing it through a passage in a first heat exchanger, passing cold gas countercurrently through another passage in the exchanger in indirect contact with said mixture to cause it to deposit impurities in the first passage, stopping flow of said cold gas to the exchanger and directing it through a passage a second exchanger, subsequently stopping flow of said mixture to the first exchanger and directing it through a passage in the second exchanger in indirect contact with said cold gas, directing gas from the warm end of the gas passage in the second exchanger to the warm end of the gas passage in the first exchanger and conducting it in reverse direction through said latter gas passage and then in reverse direction through the other passage in the same exchanger to remove said impurities therefrom.

6. Continuously operable gas purifying apparatus for use with a gas separation unit, comprising a pair of heat exchangers each having a passage therethrough for incoming gaseous mixture flowing to the separation unit, each exchanger having another passage therethrough for countercurrent flow of an outgoing cold gas separated in said unit, valve means for stopping the flow of said gaseous mixture to either of the exchangers while it is flowing through the other one, valve means for directing said outgoing cold gas to the exchanger through which said mixture is flowing so as to cool the mixture, said valve means being operable to switch said gaseous mixture and cold gas from one exchanger to the other when the mixture passage through the first exchanger becomes obstructed by impurities deposited therein by the cooled gaseous mixture flowing through it, conduits for directing warmed gas that had been separated in said unit to the warm end of the cold gas passage in the obstructed exchanger for reverse flow therethrough, and means for conducting the gas leaving the cold end of said last-mentioned gas passage to the adjacent cold end of the obstructed mixture passage in the same exchanger for reverse flow through said mixture passage to remove said impurities therefrom while the gaseous mixture continues to flow through the other exchanger and to be cooled therein by said outgoing cold gas.

DUFFER B. CRAWFORD.

REFERENCES CITED

The following references are of record in the file of this patent:

UNITED STATES PATENTS

| Number | Name | Date |
|---|---|---|
| 2,113,680 | De Baufre | Apr. 12, 1938 |